UNITED STATES PATENT OFFICE.

HARRY S. MORK, OF BROOKLINE, MASSACHUSETTS, ASSIGNOR, BY MESNE ASSIGNMENTS, TO AMERICAN LA FRANCE FIRE ENGINE COMPANY, INC., OF ELMIRA, NEW YORK, A CORPORATION OF NEW YORK.

FIRE-EXTINGUISHING COMPOSITION.

1,306,707.         Specification of Letters Patent.     Patented June 17, 1919.

No Drawing.     Application filed January 14, 1918. Serial No. 211,832.

*To all whom it may concern:*

Be it known that I, HARRY S. MORK, a citizen of the United States, residing at Brookline, county of Norfolk, State of Massachusetts, have invented a certain new and useful Fire-Extinguishing Composition, of which the following is a specification.

My invention relates to fire extinguisher charges and more particularly to the carbonate solution from which carbon dioxid for expelling the extinguishing medium is generated by reaction with a suitable acid. Alkali metal salts of carbonic acid, either in the form of bicarbonate or in the form of the normal carbonate have been commonly employed for such solutions, while sulfuric acid or hydrochloric acid has usually been employed as the acid charge. In order that the carbonate solution may always remain in a condition suitable for use even when exposed to low temperature, it has been proposed to incorporate in the carbonate solution, an ingredient for lowering the freezing point thereof. Most of those ingredients which have been heretofore proposed for this purpose are subject to one disadvantage or another. In some instances, the addition agent tends to give rise to the formation of a precipitate of insoluble carbonate or other salt or to retard the generation or evolution of the carbon dioxid gas; or its effect in small quantities has not been sufficiently marked in depressing the freezing point.

The object of my invention is to produce a carbonate solution charge of the desired low freezing point which shall be free from the disadvantages above noted. At the same time, the invention seeks to avoid the use of ingredients which might involve undue expense, or which would in any way interfere with the fire extinguishing qualities of the medium which is to be ejected from the apparatus.

According to this invention, the carbonate solution embodying the ingredient for depressing the freezing point exhibits all the good qualities desired in a medium of this character and indeed the capacity of the solution for generating carbon dioxid gas, may even be increased due to the presence of the ingredient for depressing the freezing point.

The carbonate solution embraced by my present invention comprises as essential ingredients, an alkali metal salt of carbonic acid, and an alkali metal lactate. These essential ingredients may be dissolved, for example, in water.

To clearly illustrate the principles of the invention, I shall accordingly first describe in detail an embodiment of the invention in which the solution comprises as its essential ingredients, the normal carbonate of sodium and lactate of sodium. It will be understood that these ingredients are present in a water solution.

By properly proportioning the sodium carbonate and sodium lactate in a solution of suitable concentration, a freezing point of $-80°$ F. or even lower can readily be attained with these substances. Such a low freezing point is, of course, not really necessary for practical considerations, as it would represent an extreme case which would perhaps never be met with in practice. It is referred to, however, as indicating the remarkable property which the sodium lactate has in its effect upon the freezing point of a sodium carbonate solution. To attain the freezing point mentioned, one may emply a solution comprising 3.49 grams of sodium carbonate and 66 grams of sodium lactate in one hundred cubic centimeters of water. A solution having the above composition and concentration, while possessing the low freezing point referred to, does not, however, retain all the better qualities at so low a temperature. While it remains still quite fluid at a temperature as low as in the neighborhood of $-33°$ F. the solution gradually becomes more and more viscous with increased lowering of temperature, but there is no tendency to crystallization.

The evolution of carbon dioxid gas from a solution containing sodium carbonate and sodium lactate is in no way interfered with by the presence of the sodium lactate, but on the contrary, is appreciably improved. Assuming a solution containing 3.49 grams of sodium carbonate and one hundred cubic centimeters of water, from which solution a test sample of fifteen cubic centimeters at 20° C. is treated with 1 c. c. of sulfuric acid of sufficient strength to neutralize two-thirds of the carbonate present, a test of the total gas evolution showed about 26½ cubic centimeters at the end of one minute, 28 cubic centimeters at the end of two minutes, 28½ cubic centimeters at the end of three minutes and no further increase up to five minutes. This same test quantity from a solution made up of 3.49 grams sodium carbonate and 66 grams of sodium lactate in 100 cubic centimeters of water, at the same temperature and with the same quantity of acid, showed a gas evolution of about 32 cubic centimeters at the end of the first minute, 33½ cubic centimeters at the end of the second minute, 34 cubic centimeters at the end of the third minute and no further increase up to the end of the fifth minute. From this it appears that the presence of the sodium lactate in the solution, substantially increases the capacity of the solution for setting free the pressure medium employed for expelling the extinguisher fluid. The fire extinguishing property is not adversely affected by the lactate.

It will be understood that the proportions of the various ingredients may be varied as desired, the proportions herein given being intended only to illustrate one example, and being sufficient to enable those skilled in this art to understand and practise the invention.

In place of the normal sodium carbonate, the bicarbonate of sodium, may be employed with the sodium lactate as already pointed out. A solution made up of 5.53 grams of sodium bicarbonate and 33 grams of sodium lactate in 100 cubic centimeters of water, for example, exhibits a freezing point of close to —46° F. Such a solution would thus be inferior to the solution of the normal carbonate with sodium lactate above described, where extremely low temperatures are encountered, and it is also noticed that the viscous or pasty condition refered to in connection with the normal carbonate solution with sodium lactate exhibits itself earlier in this example, as the temperature is lowered. The evolution of gas from this solution is likewise not so advantageous as in the solution employing the normal carbonate of sodium.

A solution in which potassium carbonate is employed with sodium lactate may have a freezing point as low as, or even lower than that exhibited by the solution of normal sodium carbonate with the sodium lactate. For example, a solution made of 4.54 grams of potassium carbonate and 66 grams of sodium lactate in 100 cubic centimeters of water, has a freezing point somewhat lower than —85° F. It retains its fluid state about as well as the normal carbonate solution referred to, being quite fluid at about —35° F. and becoming more and more viscous below —40° F. The gas evolution is also improved by the sodium lactate in the potassium carbonate solution.

Examination and tests of other alkali metal carbonates as well as other alkali metal lactates indicate that the good properties for the purposes of the present invention are substantially common to these classes of compounds, and I may refer to any of the above described salts of carbonic acid, or ammonium bicarbonate or potassium bicarbonate as having been found to give good results with either the sodium lactate or potassium lactate. It is believed however that the detailed descriptions above given will suffice to make the invention clear. In any case it may be assumed merely by way of example that the different ingredients can be advantageously employed in about the following proportions in 100 c. c. of water; 3.49 gms. sodium carbonate with 66 gms. of sodium lactate or 75.3 gms. potassium lactate; 5.53 gms. of sodium bicarbonate with 33 gms. of sodium lactate or 70.3 gms. of potassium lactate; 4.54 gms. of potassium carbonate with 66 gms. of sodium lactate or 75.6 gms. of potassium lactate; 6.60 gms. of potassium bicarbonate with 30.4 gms. of sodium lactate or 70.0 gms. of potassium lactate; 5.21 gms. of ammonium bicarbonate with 30.6 gms. of sodium lactate or 70.0 gms. of potassium lactate.

Any of the above compositions may be employed with good effect as a medium for the extinction of fire. It will be understood that in practice, the solutions are employed by being incorporated in a suitable receptacle in which they may be subjected to the action of a suitable acid, such as hydrochloric acid or sulfuric acid, which is normally separate from the carbonate solution but which may be readily brought into contact therewith as by being introduced into the same for the generation of carbon dioxid gas which will thereupon develop a pressure and expel the contents of the extinguisher upon the fire. The carbonate or bicarbonate charge may be for example 50% in excess of the calculated amount necessary to neutralize the acid.

While I describe and claim in the present application the use of alkali metal carbonate and alkali metal lactate in general, I claim specifically in this application, the use of normal sodium carbonate and sodium lactate, reserving for other applications the specific subject matter of the solution embodying other alkali metal salts of carbonic acid and other alkali metal lactates.

I claim:

1. A carbonate solution for fire extinguishers, comprising as essential ingredients, an alkali metal salt of carbonic acid and an alkali metal lactate.

2. A carbonate solution for fire extinguishers, comprising as essential ingredients, an alkali metal salt of carbonic acid and sodium lactate.

3. A carbonate solution for fire extinguishers, comprising as essential ingredients a sodium salt of carbonic acid and an alkali metal lactate.

4. A carbonate solution for fire extinguishers, comprising as essential ingredients a sodium salt of carbonic acid and lactate of sodium.

5. A carbonate solution for fire extinguishers, comprising as essential ingredients normal sodium carbonate and an alkali metal lactate.

6. A carbonate solution for fire extinguishers, comprising as essential ingredients normal sodium carbonate and lactate of sodium.

7. A carbonate solution for fire entinguishers, comprising as essential ingredients normal sodium carbonate and lactate of sodium, substantially in the proportions of 3.49 grams of sodium carbonate, 66 grams of sodium lactate and 100 cubic centimeters of water.

HARRY S. MORK.